J. C. W. GRETH.
AUTOMATIC PURIFIER FOR SWIMMING POOLS.
APPLICATION FILED FEB. 24, 1915.
1,144,327.
Patented June 22, 1915.
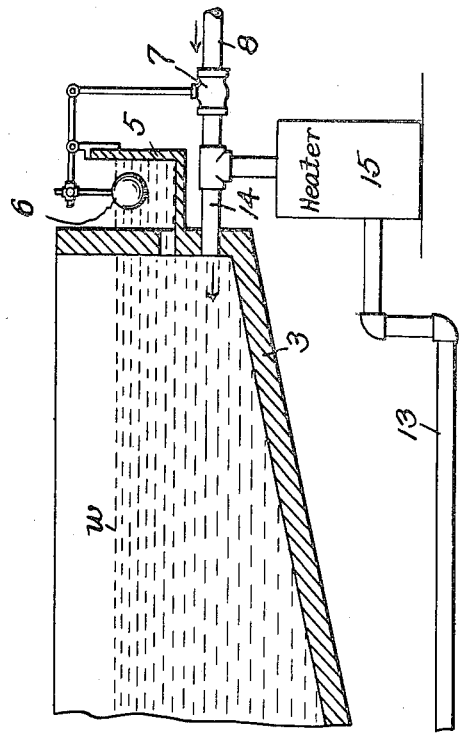
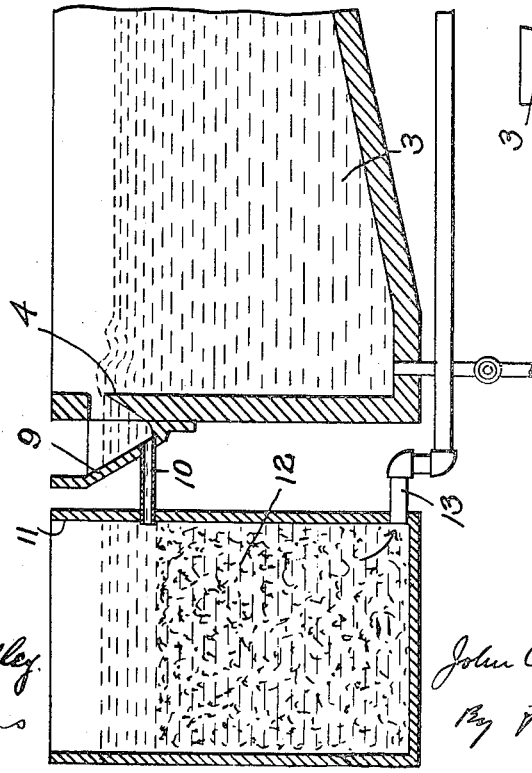
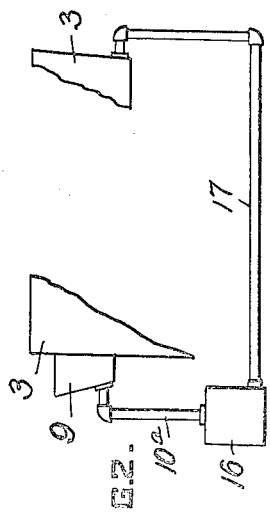

UNITED STATES PATENT OFFICE.

JOHN C. W. GRETH, OF PITTSBURGH, PENNSYLVANIA.

AUTOMATIC PURIFIER FOR SWIMMING-POOLS.

1,144,327.  Specification of Letters Patent.  Patented June 22, 1915.

Application filed February 24, 1915. Serial No. 10,178.

*To all whom it may concern:*

Be it known that I, JOHN C. W. GRETH, a citizen of the United States, residing at Pittsburgh, in the State of Pennsylvania, have invented a certain new and useful Automatic Purifier for Swimming-Pools, of which the following is a specification.

My invention relates generally to swimming pools, and its more particular object is to continually purify the water therein by means which are in effect automatic. That is, I propose to draw off the upper parts of the water by utilizing the phenomena of rise of level when swimmers are in the pool, and of the splashing and forming of waves by their movements, and utilize this rise of level to carry the water through the filter and return it to the pool automatically.

I have illustrated the invention in the accompanying drawing, in which:

Figure 1 is a longitudinal section and partial side elevation of the pool and the attached apparatus; and Fig. 2 is a partial side view indicating a modification of the arrangement, using a pressure filter.

At some point, and preferably at the deep end of the tank 3, I provide by an overflow opening 4, located a short distance above the normal level W of the water in the pool, which is kept constant by means of an auxiliary chamber 5, a float 6, and a regulating valve 7 in the main inlet pipe 8. At this overflow port I provide a trough 9 which leads by any convenient piping 10 into a tank 11 containing filtering material 12. And from the bottom of the filter 12 I lead the pipe 13 back to a submerged inlet 14 into the pool. This may conveniently be joined with the main water inlet 8, and also it is usually advisable to insert a heater 15 as shown.

As shown in Fig. 2 the pipe 10ª is led into the top of a pressure filter 16, and thence returned by pipe 17 as before. The particular form of the filter is not material to the invention. However, it will be observed that when swimmers jump into the pool the level W will be raised and inevitably waves will be formed, which will carry over the top strata of water into the trough 9, thereby raising the level of water in the filter 12 above the level W in the pool. The amount of water thus forced out of the pool will be roughly proportional to the number of swimmers, and the time they are in the pool, so that the purifying of water is virtually proportional to the amount of use of it. Of course it will be understood that the head of water in the filter 12 or trough 9 is sufficient to carry the water through either the gravity filter or the pressure filter to the other end of the U-tube 13, so that water will continually circulate and be purified, with the additional advantage, in the particular form of apparatus shown, that it may be continually heated and kept at proper temperature while in use.

The advantages of the device will readily appear to those familiar with the art.

Having thus described my invention and illustrated its use, I claim the following:

1. The method of continually purifying the water of a swimming pool which consists in maintaining a normal fixed level, raising part of the water above said level by the immersion of swimmers therein, filtering the water by gravity, and leading it back into the pool, substantially as described.

2. Apparatus for purifying the water of swimming pools, comprising the provision of an overflow receptacle placed above the normal level of the water in the pool, and a filter and gravity return tube connecting with the pool, substantially as described.

3. A swimming pool provided with a main water inlet, an automatic device to maintain a fixed level in the pool, an overflow chamber arranged just above said normal level, a filter connected with said overflow, and a return pipe leading back into the pool and containing a heater therein.

In testimony whereof I have hereunto signed my name in the presence of two subscribed witnesses.

JOHN C. W. GRETH.

Witnesses:
LOUIS P. STEHLE,
D. N. RANDOLPH.